(12) United States Patent  
Li

(10) Patent No.: US 12,267,236 B2
(45) Date of Patent: Apr. 1, 2025

(54) PACKET TRANSMISSION METHOD AND APPARATUS, AND DEVICE

(71) Applicant: Huawei Technologies Co., Ltd., Shenzhen (CN)

(72) Inventor: Jiuyong Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 354 days.

(21) Appl. No.: 17/866,748

(22) Filed: Jul. 18, 2022

(65) Prior Publication Data
US 2022/0360529 A1 Nov. 10, 2022

Related U.S. Application Data

(63) Continuation of application No. PCT/CN2020/115737, filed on Sep. 17, 2020.

(30) Foreign Application Priority Data

Jan. 19, 2020 (CN) .......................... 202010060034.5

(51) Int. Cl.
*H04L 45/74* (2022.01)
*H04L 12/46* (2006.01)
*H04L 61/103* (2022.01)

(52) U.S. Cl.
CPC .......... *H04L 45/74* (2013.01); *H04L 12/4633* (2013.01); *H04L 12/4641* (2013.01); *H04L 61/103* (2013.01)

(58) Field of Classification Search
CPC . H04L 45/74; H04L 12/4633; H04L 12/4641; H04L 61/103; H04L 12/4604;
(Continued)

(56) References Cited

U.S. PATENT DOCUMENTS

2018/0302242 A1 10/2018 Hao et al.
2019/0132241 A1 5/2019 Vattem et al.
(Continued)

FOREIGN PATENT DOCUMENTS

CN 105099847 A 11/2015
CN 106936939 A 7/2017
(Continued)

OTHER PUBLICATIONS

Mahalingam, M. et al.: "Virtual extensible Local Area Network (VXLAN): A Framework for Overlaying Virtualized Layer 2 Networks over Layer 3 Networks"; rfc7348, Aug. 27, 2014, Total 22 Pages.

*Primary Examiner* — Rownak Islam
(74) *Attorney, Agent, or Firm* — Conley Rose, P.C.

(57) ABSTRACT

A packet transmission method includes a first virtual extensible local area network tunnel endpoint (VTEP) receiving a first packet from a first host and sending a second packet to a third VTEP based on a first IP address corresponding to the first host, where the second packet is obtained by the first VTEP by encapsulating the first packet, where the first host is multi-homed to a second VTEP and the first VTEP, where the second VTEP is configured to send a packet from the first host to the third VTEP based on a second Internet Protocol (IP) address corresponding to the first host, and where the first IP address is the same as the second IP address.

20 Claims, 4 Drawing Sheets

(58) Field of Classification Search
CPC ....... H04L 2012/4629; H04L 2101/677; H04L 45/28; H04L 45/54; H04L 61/00; H04L 45/745
USPC .................................................. 370/392, 329
See application file for complete search history.

(56) References Cited

U.S. PATENT DOCUMENTS

2019/0288948 A1* 9/2019 Hira ...................... H04L 45/125
2020/0021523 A1 1/2020 Wang et al.
2020/0136955 A1* 4/2020 Chen .................. H04L 63/0272

FOREIGN PATENT DOCUMENTS

| CN | 108600074 A | 9/2018 |
|---|---|---|
| EP | 3379806 A1 | 9/2018 |
| EP | 3451593 A1 | 3/2019 |
| EP | 3582449 A1 | 12/2019 |
| WO | 2014101394 A1 | 7/2014 |
| WO | 2017008712 A1 | 1/2017 |

\* cited by examiner

PACKET TRANSMISSION METHOD AND APPARATUS, AND DEVICE

CROSS-REFERENCE TO RELATED APPLICATIONS

This is a continuation of International Patent Application No. PCT/CN2020/115737 filed on Sep. 17, 2020, which claims priority to Chinese Patent Application No. 202010060034.5 filed on Jan. 19, 2020. The disclosures of the aforementioned applications are hereby incorporated by reference in their entireties.

TECHNICAL FIELD

This disclosure relates to the field of packet transmission technologies, and in particular, to a packet transmission method and apparatus, and a device.

BACKGROUND

A virtual extensible local area network (VXLAN) is gradually widely used in data center networks. VXLAN is one of Network Virtualization over Layer 3 (NVO3) standard technologies defined by the Internet Engineering Task Force (IETF), and is essentially a tunneling technology. When a packet is forwarded in a VXLAN network, a VXLAN tunnel endpoint (VTEP) of a switch connected to a transmit end device (a virtual machine (VM) or a physical machine) may add a VXLAN header to an original packet sent by the transmit end device to obtain a VXLAN packet, and forward the VXLAN packet to a VTEP connected to a receive end device (a VM or a physical machine) in a transmission manner in an Internet Protocol (IP) network. Correspondingly, the VTEP of a switch connected to the receive end device may remove an outer encapsulation part of the VXLAN packet, and send the original packet to the receive end device. For ease of description, the VTEP and the switch on which the VTEP is located are not distinguished below, unless otherwise specified.

When the transmit end device is multi-homed to a plurality of VTEPs, each of the plurality of VTEPs may encapsulate an original packet into a VXLAN packet and forward the VXLAN packet to the receive end device. In this case, a media access control (MAC) entry or a routing entry on the switch on which the VTEP connected to the receive end device is located may record IP addresses of the plurality of VTEPs for the transmit end device. In this way, when the receive end device sends a packet to the transmit end device through the VTEP connected to the receive end device, the switch on which the VTEP is located may perform, according to an equal cost multipath (ECMP) algorithm, load balancing on a plurality of equal-cost forwarding paths corresponding to the transmit end device, that is, determine an IP address of a VTEP for receiving the packet from the IP addresses of the plurality of VTEPs.

However, index resources on the switch that are used to indicate the plurality of equal-cost forwarding paths corresponding to the transmit end device are limited. For example, in actual application, the index resources may be only 4 thousand (K) to 32K. Consequently, it is difficult for the index resources of the switch to support multi-homing access of a large quantity of transmit end devices. This limits a scale in a multi-homing access scenario in the VXLAN network.

SUMMARY

To resolve the foregoing problem, embodiments of this disclosure provide a packet transmission method and apparatus, and a device, to increase a quantity of multi-homed devices in a VXLAN network and expand a scale in a multi-homing access scenario in the VXLAN network.

According to a first aspect, an embodiment of this disclosure provides a packet transmission method, and the method includes: a first VTEP receives a first packet from a first host; and the first VTEP sends a second packet to a third VTEP based on a first IP address corresponding to the first host, where the second packet is obtained by the first VTEP by encapsulating the first packet, the first host is multi-homed to a second VTEP and the first VTEP, the second VTEP is configured to send a packet from the first host to the third VTEP based on a second IP address corresponding to the first host, and the first Internet Protocol (IP) address is the same as the second IP address. In this implementation, the first VTEP and the second VTEP may forward packets for the first host based on a same IP address. Therefore, the third VTEP at the peer end stores one IP address of an egress port device for the first host in a local MAC table after receiving the packets separately sent by the first VTEP and the second VTEP. Accordingly, the third VTEP may store only one index for a forwarding path corresponding to the first host. In this way, when index resources of the third VTEP are limited, the first VTEP and the second VTEP may support multi-homing access of more hosts, so that a quantity of multi-homed devices is increased.

Optionally, the method further includes: when the first VTEP receives an Address Resolution Protocol (ARP) request from the first host through a preset access port, the first VTEP sends a first advertisement packet for the first host to the second VTEP and/or the third VTEP based on the first IP address, where the first advertisement packet includes a MAC address of the first host and the first IP address. In this implementation, when the first VTEP receives, from the fixed access port, the ARP request sent by the first host, the first VTEP may determine, for the first host, an IP address for packet forwarding. In this way, an IP address that is of the first VTEP and that is corresponding to each accessed host may be determined in a static configuration manner, and there is no need for the first VTEP to perform a complex operation process to allocate a corresponding IP address for each newly accessed host.

Optionally, the method further includes: when the first VTEP receives a second advertisement packet for the first host from the second VTEP, the first VTEP sends a first advertisement packet for the first host to the second VTEP and/or the third VTEP based on the first IP address, where the first advertisement packet and the second advertisement packet include a MAC address of the first host, the second advertisement packet does not include the first IP address, and the first advertisement packet includes the first IP address. In this implementation, the first VTEP and the second VTEP may determine, through negotiation, an IP address to be used by the first VTEP for forwarding a packet for the first host. When receiving an advertisement packet sent by the second VTEP, the first VTEP may configure an IP address used by the second VTEP to send the advertisement packet as the IP address to be used for forwarding a packet for the first host. In this way, the first VTEP and the second VTEP may perform dynamic negotiation by sending advertisement packets to each other, so that the first VTEP and the second VTEP can send packets for the first host based on a same IP address.

Optionally, the method further includes: before the first VTEP receives the second advertisement packet sent by the second VTEP based on the second IP address, the first VTEP sends a third advertisement packet to the second VTEP and/or the third VTEP based on an initial IP address, where the initial IP address is different from the first IP address. In this implementation, if the first VTEP does not receive an advertisement packet sent by the second VTEP, the first VTEP may use the initial IP address as an IP address for performing advertisement for the first host. For example, the first VTEP may send an advertisement packet for the first host based on an IP address corresponding to another host, and after the first VTEP receives an advertisement packet sent by the second VTEP for the first host, the first VTEP adjusts the initial IP address to an IP address used by the second VTEP to send the advertisement packet, so that the first VTEP and the second VTEP forward packets for the first host based on a same IP address.

Optionally, the method further includes: when the first VTEP fails to send the second packet to the third VTEP, the first VTEP sends a third packet to the second VTEP, where the third packet is obtained by the first VTEP by encapsulating the first packet. In this implementation, when the first VTEP may fail to send a packet to the third VTEP due to some faults or condition limitations, the first VTEP may forward, to the second VTEP, a packet sent by the first host. During specific implementation, the third packet may be sent to the second VTEP based on the first IP address. Certainly, the third packet may alternatively be sent to the second VTEP based on another IP address. Then, the second VTEP may decapsulate the received third packet, perform re-encapsulation based on the second IP address, and send a packet obtained after re-encapsulation to the third VTEP based on the second IP address. In other words, the first VTEP may forward the packet for the first host in a traffic detour manner.

Optionally, a quantity of devices to which the first host is multi-homed is a first quantity, and the method further includes: when the quantity of VTEPs to which the first host is multi-homed changes from the first quantity to a second quantity, the first VTEP configures a third IP address corresponding to the second quantity for the first host, where the third IP address is different from the first IP address. In this implementation, different quantities of devices to which the first host is multi-homed may correspond to different IP addresses. Therefore, after the quantity of devices to which the first host is multi-homed changes, an IP address corresponding to the first host is adjusted, so that a VTEP that the first host accesses does not need to perform a traffic detour process for a packet sent to the first host. For example, it is assumed that VTEPs to which a host is initially multi-homed include a VTEP 1, a VTEP 2, and a VTEP 3. After the VTEPs to which the host is multi-homed include only the VTEP 1 and the VTEP 2, because the VTEP 1 and the VTEP 2 change an IP address corresponding to the host, a packet sent to the host may not be received by the VTEP 3 that is disconnected from the host. In this way, a case in which the VTEP 3 performs a traffic detour process because the VTEP 3 receives the packet sent to the host can be avoided (that is, the packet is forwarded to the host through the VTEP 1/VTEP 2).

Optionally, a quantity of VTEPs to which the first host is multi-homed is a first quantity, and that the first VTEP sends a second packet to a third VTEP based on a first IP address corresponding to the first host includes: when the quantity of VTEPs to which the first host is multi-homed changes from the first quantity to a second quantity, the first VTEP sends the second packet to the third VTEP based on the first IP address. In this implementation, even if the quantity of VTEPs to which the first host is multi-homed changes, the first VTEP may still forward a packet for the first host based on an initial IP address. In particular, when the first host is disconnected from a VTEP due to a fault or the like within a short time, the VTEP may still receive a packet based on an IP address corresponding to the host, and send the packet to the first host through another VTEP in a traffic detour manner.

Optionally, the first VTEP is further connected to a second host, and the method further includes: the first VTEP sends a fourth packet to the third VTEP based on a fourth IP address corresponding to the second host, where the fourth IP address is different from the first IP address. In this implementation, the first VTEP may configure different IP addresses for different accessed hosts to forward packets, so that after the first VTEP receives a packet sent by the third VTEP at the peer end, the first VTEP may determine, based on a destination IP address included in the packet, to send the packet to a host corresponding to only the destination IP address, instead of sending the packet to all hosts accessing the first VTEP.

According to a second aspect, an embodiment of this disclosure provides a packet transmission apparatus. The apparatus may be used in a first VTEP. The apparatus may include a receiving module, a processing module, and a sending module. The receiving module is configured to receive a first packet from a first host. The sending module is configured to send a second packet to a third VTEP based on a first IP address corresponding to the first host, where the second packet is obtained by the processing module by encapsulating the first packet, the first host is multi-homed to a second VTEP and the first VTEP, the second VTEP is configured to send a packet from the first host to the third VTEP based on a second IP address corresponding to the first host, and the first IP address is the same as the second IP address.

In some possible implementations, the sending module is further configured to: when the receiving module receives an ARP request from the first host through a preset access port, send a first advertisement packet for the first host to the second VTEP and/or the third VTEP based on the first IP address, where the first advertisement packet includes a MAC address of the first host and the first IP address.

In some possible implementations, the sending module is further configured to: when the receiving module receives a second advertisement packet for the first host from the second VTEP, send a first advertisement packet for the first host to the second VTEP and/or the third VTEP based on the first IP address, where the first advertisement packet includes a MAC address of the first host, the second advertisement packet does not include the first IP address, and the first advertisement packet includes the first IP address.

In some possible implementations, the sending module is further configured to: before the receiving module receives the second advertisement packet sent by the second VTEP based on the second IP address, send a third advertisement packet to the second VTEP and/or the third VTEP based on an initial IP address, where the initial IP address is different from the first IP address.

In some possible implementations, the sending module is further configured to: when the first VTEP fails to send the second packet to the third VTEP, send a third packet to the second VTEP based on the first IP address, where the third packet is obtained by the processing module by encapsulating the first packet.

In some possible implementations, a quantity of devices to which the first host is multi-homed is a first quantity, and the processing module is further configured to: when the quantity of VTEPs to which the first host is multi-homed changes from the first quantity to a second quantity, configure a third IP address corresponding to the second quantity for the first host, where the third IP address is different from the first IP address.

In some possible implementations, a quantity of devices to which the first host is multi-homed is a first quantity, and the sending module is configured to: when the quantity of VTEPs to which the first host is multi-homed changes from the first quantity to a second quantity, send the second packet to the third VTEP based on the first IP address.

In some possible implementations, the first VTEP is further connected to a second host, and the sending module is further configured to send a fourth packet to the third VTEP based on a fourth IP address corresponding to the second host, where the fourth IP address is different from the first IP address.

The packet transmission apparatus described in the second aspect is corresponding to the packet transmission method described in the first aspect. Therefore, for various possible implementations in the second aspect and beneficial effects thereof, refer to related descriptions of corresponding implementations and beneficial effects in the first aspect. Details are not described herein again.

According to a third aspect, this disclosure further provides a device. The computer device includes a processor, and the processor is coupled to a memory. The memory is configured to store computer programs or instructions, and the processor is configured to execute the computer programs or instructions, so that the device performs the packet transmission method according to any one of the first aspect or the implementations of the first aspect.

The packet transmission device described in the third aspect is corresponding to the packet transmission method described in the first aspect. Therefore, for various possible implementations in the third aspect and beneficial effects thereof, refer to related descriptions of corresponding implementations and beneficial effects in the first aspect. Details are not described herein again.

According to a fourth aspect, this disclosure provides a computer storage medium, storing a program used to implement the packet transmission method according to any one of the first aspect or the implementations of the first aspect. When a packet transmission device runs the program, the device is enabled to perform the packet transmission method according to any one of the first aspect or the implementations of the first aspect.

According to a fifth aspect, this disclosure provides a computer program product, including a program. When the program is run, the packet transmission method according to any one of the first aspect or the implementations of the first aspect is performed.

It can be learned from the foregoing technical solution that, in this disclosure, the first VTEP receives the first packet from the first host; and the first VTEP sends the second packet to the third VTEP based on the first IP address corresponding to the first host, where the second packet is obtained by the first VTEP by encapsulating the first packet, the first host is multi-homed to the second VTEP and the first VTEP, the second VTEP is configured to send a packet from the first host to the third VTEP based on the second IP address corresponding to the first host, and the first IP address is the same as the second IP address. The first VTEP and the second VTEP may forward packets for the first host based on a same IP address. Therefore, the third VTEP may store only one index for a forwarding path corresponding to the first host. In this way, when index resources of the third VTEP are limited, more hosts may access the first VTEP and the second VTEP, so that a quantity of multi-homed devices is increased.

BRIEF DESCRIPTION OF DRAWINGS

To describe technical solutions of embodiments of this disclosure more clearly, the following briefly describes the accompanying drawings for describing the embodiments. It is clear that the accompanying drawings in the following descriptions show merely some embodiments of this disclosure, and a person of ordinary skill in the art may derive other drawings from these accompanying drawings.

DESCRIPTION OF EMBODIMENTS

This disclosure provides a packet transmission method, to increase a quantity of multi-homed devices in a VXLAN network when index resources corresponding to a plurality of equal-cost forwarding paths are limited. With reference to the accompanying drawings, the following uses a VXLAN network as an example to describe a packet transmission method provided in this disclosure.

Figure 1:
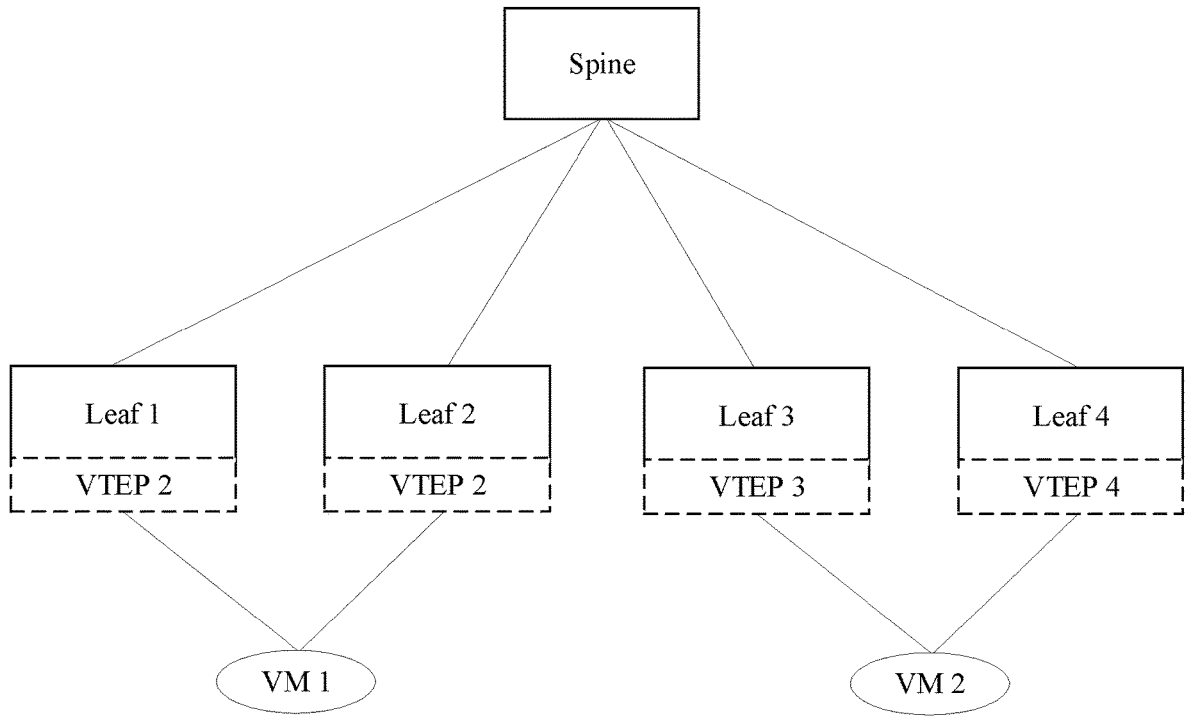
FIG. 1 is a schematic diagram of an architecture of an example VXLAN network according to an embodiment of this disclosure.

FIG. 1 is a schematic diagram of a structure of a VXLAN network according to an embodiment of this disclosure. The VXLAN network is overlaid on a data center network of a leaf-spine structure. The data center network includes a leaf layer and a backbone layer. The leaf layer includes a plurality of leaf devices, for example, a leaf 1 to a leaf 4 in the figure. The backbone layer includes one or more spine devices (only one spine device is shown in the figure). Each leaf device communicates with another leaf device through a spine device. Each host may access one leaf device (single-homing access) or a plurality of leaf devices (multi-homing access). This disclosure focuses on a scenario in which one host accesses a plurality of leaf devices. For example, a VM 1 is multi-homed to the leaf 1 and the leaf 2, and a VM 2 is multi-homed to the leaf 3 and the leaf 4. In this case, the leaf 1 and the leaf 2 belong to a same multi-homing access group, and the leaf 3 and the leaf 4 belong to a same multi-homing access group.

In the VXLAN network shown in FIG. 1, corresponding VTEPs (which are respectively a VTEP 1, a VTEP 2, a VTEP 3, and a VTEP 4) may be separately deployed on the leaf 1 to the leaf 4. Different VTEPs have different IP addresses, and a packet for communication between the VM 1 and the VM 2 is transmitted through the VTEPs on the leaf nodes.

For example, when the VM 1 transmits a packet to the VM 2, the VM 1 may send the original packet to the VTEP 1, or certainly, may send the original packet to the VTEP 2. The VTEP 1 or the VTEP 2 may encapsulate a VXLAN header into the received original packet to obtain a VXLAN packet, and send the VXLAN packet to the VTEP 3 and/or the VTEP 4 at the peer end by searching a local MAC table of the VTEP 1 or the VTEP 2 (the packet may be transmitted to the VTEP 3 and/or the VTEP 4 through the spine shown in FIG. 1). In this way, the VTEP 3 and the VTEP 4 each may decapsulate the received VXLAN packet to obtain the original packet, and may determine, by searching a corresponding entry in a local MAC table, to send the original packet to the VM 2, so that the original packet sent by the VM 1 can be transmitted to the VM 2. In addition, the VTEP 3 and the VTEP 4 each may learn that IP addresses of egress port devices corresponding to a MAC address of the VM 1 are IP addresses of the VTEP 1 and the VTEP 2, and correspondingly store the MAC address and the IP addresses of the egress port devices in a local MAC table. A MAC entry for the VM 1 in the MAC table may be shown in Table 1.

TABLE 1

| MAC entry | IP address of egress port devices |
|---|---|
| MAC address of the VM 1 | IP address of the VTEP 1 + IP address of the VTEP 2 |

In this way, when the VM 2 sends a packet to the VM 1 (a destination MAC address is the MAC address of the VM 1), if the VM 2 sends the packet to the VTEP 3, the VTEP 3 may learn, by searching the local MAC table, that the destination MAC address corresponds to IP addresses corresponding to two egress port devices, that is, there are currently two equal-cost paths that can support the VTEP 3 in sending the packet to the VM 1. In this case, the VTEP 3 may request to perform load balancing on the two equal-cost paths by using an ECMP algorithm, to determine an IP address corresponding to one egress port device, that is, to determine one path used to support the VTEP 3 in sending the packet, so that the VTEP 3 may send the packet to the determined egress port device, and the egress port device forwards the packet to the VM 1.

Therefore, for the VM 1 that is dual-homed to the VTEP 1 and the VTEP 2, IP addresses corresponding to a plurality of egress port devices are recorded in the local MAC table of the VTEP 3 for the VM 1. In this case, the VTEP 3 needs to store, for the VM 1, a plurality of indexes respectively corresponding to a plurality of forwarding paths, so that when the VTEP 3 requests to perform load balancing on the plurality of equal-cost paths, an IP address corresponding to one egress port device can be determined for the VM 1 based on the plurality of indexes by using the ECMP algorithm. However, index resources corresponding to the forwarding paths that can be stored on the VTEP 3 or the leaf 3 on which the VTEP 3 is located are limited, and therefore a quantity of dual-homed devices that can be supported by the index resources is limited. Similarly, a quantity of triple-homed devices, quad-homed devices, or the like that can be supported by the index resources of the VTEP 3 or the leaf 3 on which the VTEP 3 is located is also limited.

For example, if the leaf 3 supports storage of 4K index resources, and at least 0.125K index resources are required by one forwarding path corresponding to each dual-homed device, 0.25K index resources are required by each dual-homed device. Therefore, the 4K index resources on the leaf 3 can support dual-homing access of a maximum of only 16 (that is, 4096/256) devices. When a $17^{th}$ device is dual-homed to the VTEP 1 and the VTEP 2, there is no additional index resource on the leaf 3 that can store a plurality of forwarding paths corresponding to the $17^{th}$ device. Therefore, when the VM 2 sends a packet to the $17^{th}$ device, the VTEP 3 cannot perform load balancing on the plurality of forwarding paths corresponding to the $17^{th}$ device.

Based on this, an embodiment of this disclosure provides a packet transmission method, to increase a quantity of multi-homed devices in a VXLAN network when index resources are limited. For example, the VM 1 is dual-homed to the VTEP 1 and the VTEP 2, and sends a packet to the VTEP 3. After the VM 1 sends the packet to the VTEP 1, the VTEP 1 may encapsulate the received packet, and send an encapsulated VXLAN packet to the VTEP 3 based on a first IP address. The VTEP 3 forwards a decapsulated packet to the VM 2. In this case, the VTEP 3 may learn that an IP address of an egress port device corresponding to the MAC address of the VM 1 is the first IP address. After the VM 2 sends the packet to the VTEP 2, the VTEP 2 may encapsulate the received packet, and send an encapsulated VXLAN packet to the VTEP 3 based on the first IP address. The VTEP 3 forwards a decapsulated packet to the VM 2. In this case, the VTEP 3 may learn that an IP address of an egress port device corresponding to the MAC address of the VM 1 is a second IP address. Because the first IP address is the same as the second IP address, one IP address corresponding to the MAC address of the VM 1 is stored in the local MAC table of the VTEP 3 for the MAC address of the VM 1. In this way, the VTEP 3 or the leaf 3 on which the VTEP 3 is located may store only one index for an equal-cost forwarding path between the VM 1 and the VTEP 3, that is, only one index resource may be consumed, so that consumption of index resources corresponding to the VM 1 is reduced. Similarly, when the VM 1 is multi-homed to three or more devices (that is, triple-homing access, quad-homing access, or the like), all VTEPs to which the VM 1 is multi-homed may forward packets for the VM 1 based on a same IP address, so that the VM 1 may also consume only one index. In this way, for each multi-homed device, the VTEP 3 or the leaf 3 on which the VTEP 3 is located may store only one index for the device, instead of storing a plurality of indexes, so that limited index resources of the VTEP 3 or the leaf 3 on which the VTEP 3 is located can support multi-homing access of more devices.

For example, it is assumed that the leaf 3 supports storage of 4K index resources. Because the leaf 3 may store only one index for each multi-homed device, and 0.125K index resources are consumed by the multi-homed device, the 4K index resources can support multi-homing access (including any one or a combination of dual-homing access, triple-homing access, quad-homing access, quintuple-homing access, and the like) of 32 devices. Therefore, when the index resources are limited, the quantity of multi-homed devices in the VXLAN network can be increased, and a scale in a multi-homing access scenario in the VXLAN network can be expanded.

It may be understood that embodiments of this disclosure are not limited to being applied to the VXLAN network shown in FIG. 1. For example, in another possible scenario, a multi-homed device is not limited to a VM, and may alternatively be a physical machine or the like. For another example, when accessing the leaf 1 and the leaf 2, the VM 1 may further access another leaf, that is, the VM 1 is triple-homed, quad-homed, or the like. In conclusion, embodiments of this disclosure may be applied to any applicable network, but are not limited to the network shown in FIG. 1.

Figure 2:
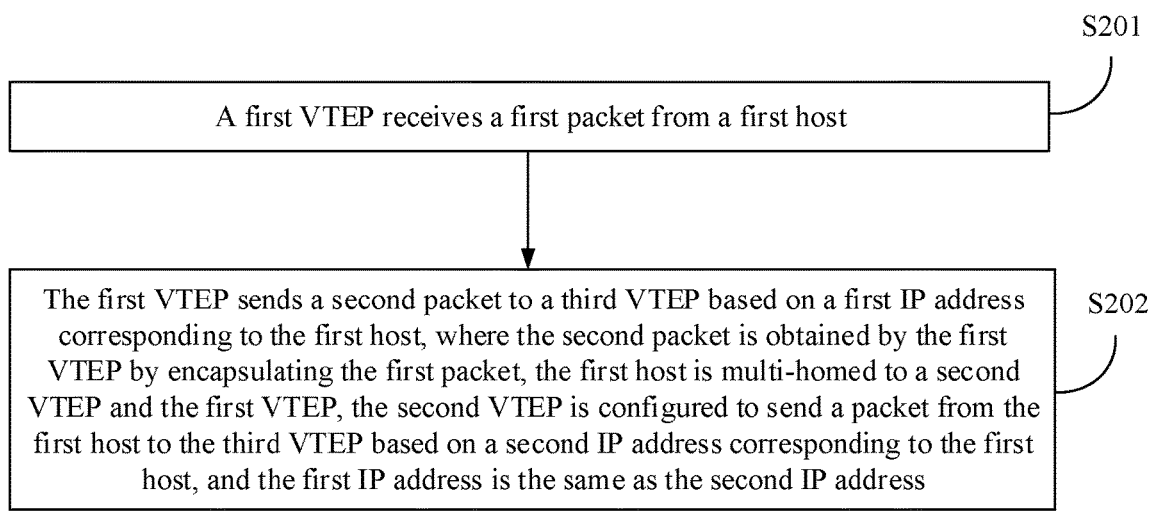
FIG. 2 is a schematic flowchart of a packet transmission method according to an embodiment of this disclosure.

Various non-limiting specific implementations of a packet transmission method in embodiments of this disclosure are described in detail below with reference to the accompanying drawings by using embodiments. For example, the embodiments may be applied to any VTEP in the VXLAN network shown in FIG. 1. FIG. 2 is a schematic flowchart of a packet transmission method according to an embodiment of this disclosure. The method may include the following steps.

S201: A first VTEP receives a first packet from a first host.

In this embodiment, when a host (referred to as the first host below) communicates with another host, the first host may send a packet (referred to as the first packet below) to the other host through an intermediate device. During specific implementation, the first host may send the first packet to the first VTEP that the first device accesses, and the first VTEP forwards the received first packet to the other host.

For example, in the VXLAN network shown in FIG. 1, the first host may be the VM 1, the other host may be the VM 2, and the intermediate device may be the VTEP 1 on the leaf 1 and the VTEP 3 on the leaf 3 (it is assumed that the VM 1 communicates with the VM 2 through the VTEP 1 and the VTEP 3). In this case, the VM 1 may first send the packet to the VTEP 1 (that is, the first VTEP), and then the VTEP 1 forwards the packet to the VM 2.

In actual application, the first host may be a VM, or may be a physical machine such as a server. The first host may be multi-homed to a plurality of VTEPs. For example, in the network shown in FIG. 1, the VM 1 may be dual-homed to the VTEP 1 and the VTEP 2.

S202: The first VTEP sends a second packet to a third VTEP based on a first IP address corresponding to the first host, where the second packet is obtained by the first VTEP by encapsulating the first packet, the first host is multi-homed to a second VTEP and the first VTEP, the second VTEP is configured to send a packet from the first host to the third VTEP based on a second IP address corresponding to the first host, and the first IP address is the same as the second IP address.

The first IP address and the second IP address are VTEP-shared IP addresses that are determined by the first VTEP and the second VTEP for the first host.

Figure 3:
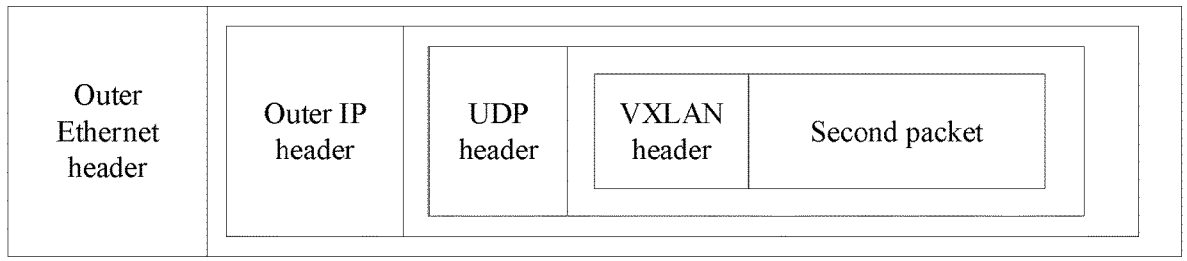
FIG. 3 is a schematic diagram of a VXLAN packet format.

In this embodiment, after receiving the first packet sent by the first host, the first VTEP may encapsulate the first packet, and an encapsulated packet is the second packet in step S202. In an example implementation, as shown in FIG. 3, the first VTEP may sequentially add a VXLAN header, a User Datagram Protocol (UDP) header, an outer IP header, and an outer Ethernet header to an original data frame (that is, content of the first packet), to obtain a VXLAN packet used as the second packet. The VXLAN packet may be transmitted through a tunnel established between the first VTEP and another tunnel endpoint (the third VTEP). A source IP address included in the outer IP header is the first IP address corresponding to the first host (an IP address corresponding to a host may be referred to as a VTEP-shared IP address), and a destination IP address (that is, an IP address of a corresponding VTEP on a peer device, for example, an IP address of the third VTEP) included in the outer IP header may be determined based on an entry that corresponds to a MAC address of a peer host and that is obtained by searching a local MAC table. Certainly, if the first device does not find, from the local MAC table, the entry corresponding to the MAC address of the peer host, the destination IP address included in the outer IP header may be an IP address (that is, a multicast address) of all VTEPs that perform layer-2 communication with the first VTEP.

After encapsulating the first packet to obtain the second packet, the first VTEP may send the second packet to the third VTEP at a peer end based on the first IP address corresponding to the first host. In this way, the third VTEP may decapsulate the received second packet, and forward a decapsulated packet to a corresponding host.

It should be noted that, in actual application, hosts accessing the first VTEP may further include another host in addition to the first host, for example, a second host. In this case, different IP addresses may be configured for the first VTEP, and the first VTEP may send a fourth packet to the third VTEP based on an IP address (that is, a VTEP-shared IP address of the second host, for example, a fourth IP address) different from the first IP address. The fourth packet is obtained by encapsulating a packet from the second host, and a packet encapsulation manner thereof is similar to a manner in which the first VTEP performs encapsulation to obtain the second packet. In this way, even if the hosts accessing the first VTEP include the first host and the second host, because a VTEP-shared IP address used by the first VTEP to forward a packet for the first host is different from that used by the first VTEP to forward a packet for the second host, when the first VTEP receives a packet sent by the third VTEP, the first VTEP may determine, based on an outer destination IP address of the packet, whether to send the packet to the first host or the second host, and may not send the packet to all the hosts accessing the first VTEP. When the outer destination IP address in the received packet is the first IP address corresponding to the first host, the first VTEP may send a decapsulated packet to only the first host, but not send the decapsulated packet to the second host. Similarly, when the outer destination IP address in the received packet is the fourth IP address corresponding to the second host, the first VTEP may send a decapsulated packet to only the second host, but not send the decapsulated packet to the first host. In particular, when the first VTEP does not find a MAC address of the first host/second host from the local MAC table, the first VTEP may determine, based on the outer destination IP address of the packet, whether to send the packet to the first host or the second host.

In actual application, the first VTEP may alternatively configure a same VTEP-shared IP address for the first host and the second host, that is, the first VTEP forwards packets for the first host and the second host based on the same IP address.

When accessing the first VTEP, the first host may also access at least the second VTEP, that is, the first host is dual-homed to at least the first VTEP and the second VTEP, so that the first host may not only send a packet through the first VTEP, but also send a packet through the second VTEP. In this embodiment, to ensure that a peer device receiving a packet stores only one index for the multi-homed first host, a same VTEP-shared IP address may be configured for the first VTEP and the second VTEP, and the first VTEP and the second VTEP may forward packets to the third VTEP for the first host based on the same VTEP-shared IP address. In this way, after the third VTEP at the peer end receives the packets separately sent by the first VTEP and the second VTEP, because the first VTEP and the second VTEP have the same VTEP-shared IP address, the third VTEP stores one IP address of an egress port device for the first host in a local MAC table. Therefore, the peer device may store only one index for a forwarding path corresponding to the first host.

It should be noted that, that the first host is multi-homed to the first VTEP and the second VTEP does not mean that devices to which the first host is multi-homed include only the first VTEP and the second VTEP. In some actual application scenarios, the first host may be multi-homed to three VTEPs or four VTEPs. For example, the devices to which the first host is multi-homed may further include a fourth VTEP. Correspondingly, the three VTEPs or the four VTEPs may configure a same VTEP-shared IP address for the first host, and each VTEP may forward a packet from the first host to the third VTEP based on the VTEP-shared IP address. In this way, even if the first host is triple-homed or quad-homed to a plurality of VTEPs, the local MAC table of the third VTEP may still store one IP address of an egress port device for the first host. Therefore, the third VTEP may still store one index for the forwarding path corresponding to the first host.

In actual application, when the first VTEP fails to send the second packet (for example, available bandwidth between the first VTEP and the third VTEP is small or there is a fault between the first VTEP and the third VTEP), the first VTEP may send the packet through the second VTEP (that is, in a traffic detour manner). During specific implementation, the first VTEP may encapsulate the first packet from the first host into a third packet, where an outer destination IP address of the third packet is an IP address (which is different from the VTEP-shared IP address) of the second VTEP, and the outer destination IP address included in the third packet is different from the outer destination IP address included in the first packet. Then, the first VTEP may send the third packet to the second VTEP. After receiving the third packet, the second VTEP may first decapsulate the third packet to obtain the first packet. Then, the second VTEP may search a local MAC table based on a destination MAC address included in the first packet, re-encapsulate the first packet based on a found entry corresponding to the destination MAC address, that is, an IP address of the third VTEP at the peer end, and send an encapsulated packet to the third VTEP at the peer end.

In some scenarios, a quantity of VTEPs to which the first host is multi-homed may change, and may change (increase or decrease) from a first quantity to a second quantity. For example, the first host may be initially dual-homed to the first VTEP and the second VTEP. When the first host is disconnected from the second VTEP (for example, because an access port of the second VTEP is faulty, the first host cannot continue accessing the second VTEP, or the first host actively breaks a connection to the second VTEP), the quantity of VTEPs accessed by the first host is reduced from 2 to 1. In this case, if the second VTEP receives a packet that needs to be sent to the first host, the second VTEP may perform traffic detour, that is, the second VTEP may forward the packet to the first VTEP, and then the first VTEP forwards the packet to the first host.

In some possible implementations, the VTEP-shared IP address configured by the first VTEP for the first host may indicate the quantity of VTEPs to which the first host is multi-homed. For example, a specific IP address or any IP address in an IP address segment may be used to indicate that the first host is dual-homed, and another specific IP address or any IP address in another IP address segment may be used to indicate that the first host is triple-homed. When the quantity of VTEPs to which the first host is multi-homed changes, the first VTEP may configure a third IP address (another VTEP-shared IP address) corresponding to the second quantity for the first host, and the configured third IP address is different from the first IP address. Certainly, another VTEP to which the first host is multi-homed may configure the same IP address for the first host. In this way, after the quantity of devices to which the first host is multi-homed changes, each VTEP may determine, based on an IP address configured for the first host, whether a traffic detour needs to be performed for the packet sent to the first host. Further, after the quantity of VTEPs to which the first host is multi-homed changes, the first VTEP may perform timing. In addition, if the quantity of VTEPs to which the first host is multi-homed is not restored, within preset duration, to the first quantity existing before the change, the third IP address corresponding to the second quantity may be configured for the first host. If the quantity of VTEPs to which the first host is multi-homed is restored to the first quantity within preset duration, no IP address may be re-configured for the first host, and each VTEP to which the first host is multi-homed may still forward a packet for the first host based on an originally configured IP address within the preset duration. Certainly, another VTEP to which the first host is multi-homed may perform an IP address configuration process similar to that performed by the first VTEP.

In the foregoing implementation, when the quantity of VTEPs to which the first host is multi-homed changes, a VTEP currently accessed by the first host may re-configure a VTEP-shared IP address for the first host. In some other possible implementations, when the quantity of VTEPs to which the first host is multi-homed changes, a VTEP currently accessed by the first host may not re-configure a VTEP-shared IP address for the first host. For the first VTEP, when the quantity of VTEPs to which the first host is multi-homed changes from the first quantity to the second quantity, the first VTEP may still send the second packet to the third VTEP based on the first IP address. For example, it is assumed that the first host is currently multi-homed to the first VTEP, the second VTEP, and a fifth VTEP. When the VTEPs to which the first host is multi-homed change to the first VTEP and the second VTEP, that is, when the first host changes from triple-homing access to dual-homing access, the first VTEP may still forward a packet for the first host based on the first IP address, and the second VTEP may still forward a packet for the first host based on the second IP address.

In actual application, when the first host accesses a plurality of VTEPs, even if a quantity of the VTEPs changes, the VTEPs accessed by the first host may always forward packets for the first host based on a same VTEP-shared IP address (the first host is always in a multi-homed state). When the quantity of VTEPs accessed by the first host changes to 1, the VTEP accessed by the first host may delete a VTEP-shared IP address configured for the first host, and forward a packet for the first host based on an IP address of the VTEP (the first host is single-homed to one VTEP).

In this embodiment, the first VTEP may send an advertisement packet to a nearby device based on a type 2 route and/or a type 5 route, to notify the nearby device of an IP address used when the first VTEP sends a packet for the first host. The VTEP-shared IP address configured by the first VTEP for the first host may be statically configured in advance, or may be dynamically negotiated by VTEPs to which the first host is multi-homed.

For example, the VTEP-shared IP address corresponding to the first host may be statically configured in advance. When the first host initially accesses the first VTEP, the first host may send an ARP request to the first VTEP through a preset access port. After receiving the ARP request from the preset access port, the first VTEP may determine, based on a pre-configured correspondence between an access port and a VTEP-shared IP address, the first IP address corresponding to the preset access port, to send a first advertisement packet for the first host to a nearby device based on the first IP address. For example, the first advertisement packet may be sent to the second VTEP and/or the third VTEP. The first advertisement packet includes at least a MAC address of the first host and the VTEP-shared IP address. In this example, for a host that completes access through a specific access port, a VTEP may forward a packet for the host based on a specific IP address. In actual application, a same correspondence between an access port and a VTEP-shared IP address may be pre-configured on VTEPs to which the host is multi-homed.

In this way, after receiving the first advertisement packet, the second VTEP and/or the third VTEP may add, to a local MAC table, the VTEP-shared IP address and the MAC address of the first host that are included in the first advertisement packet, to complete learning of a MAC entry. In actual application, when learning the MAC entry, the second VTEP and/or the third VTEP may further learn a routing entry.

In another possible example, the VTEP-shared IP address corresponding to the first host may be determined through mutual negotiation by VTEPs to which the first host is multi-homed. It is assumed that the first host is multi-homed to the first VTEP and the second VTEP. Before sending an advertisement packet to a nearby device, the first VTEP may detect whether the first VTEP receives an advertisement packet (referred to as a second advertisement packet below) sent by the second VTEP for the first host. If the first VTEP does not receive the second advertisement packet sent by the second VTEP, the first VTEP may send a third advertisement packet to the nearby second VTEP and/or third VTEP based on an initial IP address. In actual application, the initial IP address may be an IP address used when the first VTEP forwards a packet for another host, for example, an IP address of the first VTEP. If the first VTEP receives the second advertisement packet, the first VTEP may use a source IP address included in the second advertisement packet as the first IP address, and send a first advertisement packet to the nearby second VTEP and/or third VTEP based on the first IP address, to notify the nearby device that the VTEP-shared IP address corresponding to the first host is the first IP address. Correspondingly, the second VTEP and/or the third VTEP may adjust, from the initial IP address to the first IP address, an IP address that is of an egress port device and corresponds to the first host and that is recorded in the local MAC table. The second advertisement packet includes the second IP address, and the first advertisement packet sent by the first VTEP includes the first IP address that is the same as the second IP address.

When a plurality of different hosts access the first VTEP, the first VTEP may separately send corresponding advertisement packets for the different hosts based on different VTEP-shared IP addresses, to advertise a VTEP-shared IP address corresponding to each host to a nearby device.

Figure 4:
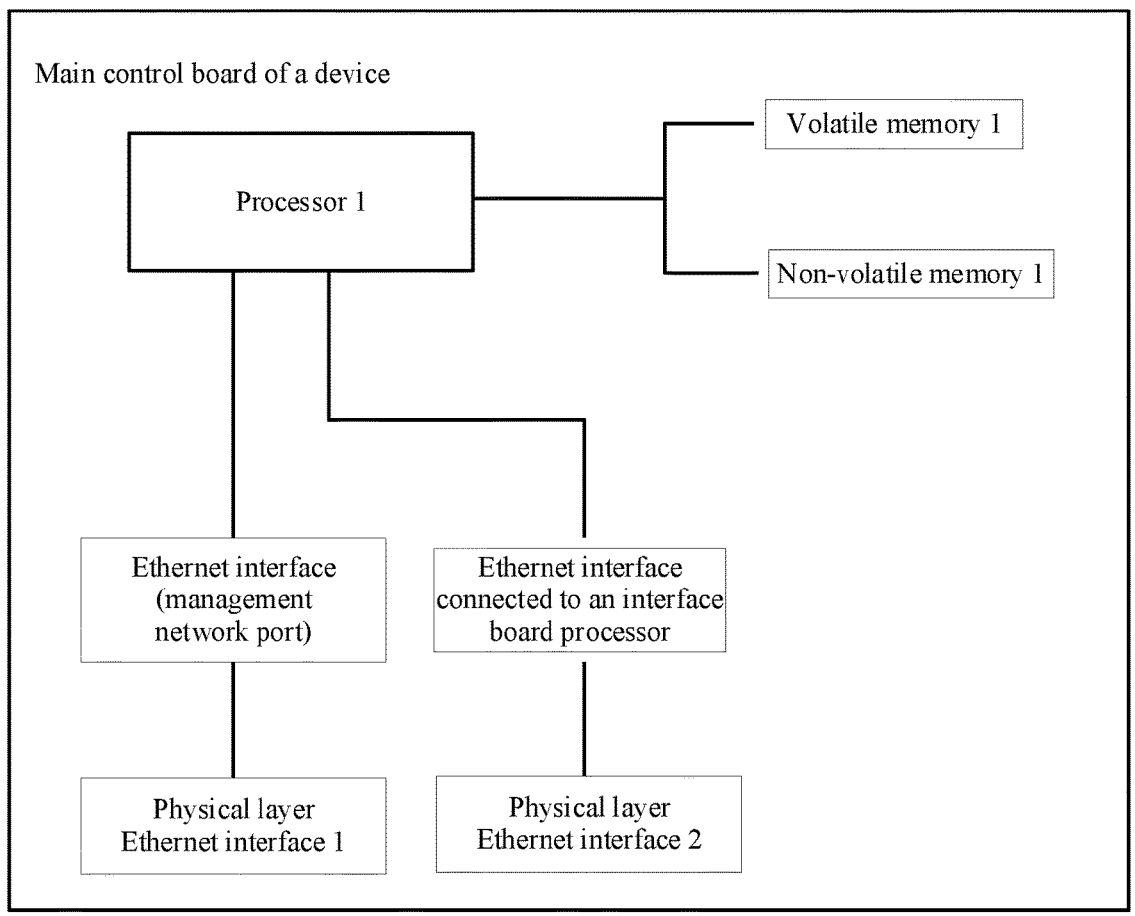
FIG. 4 is a schematic diagram of a hardware structure of a main control board of a device according to an embodiment of this disclosure.

It should be noted that, in an implementation, the first VTEP and/or the second VTEP (or a leaf device on which the first VTEP and/or the second VTEP are/is located) in the foregoing method embodiments may include a main control board and an interface board. A processor in the main control board and a processor in the interface board may cooperate to perform the foregoing actions performed by the first VTEP or the second VTEP, and control packet forwarding behavior of an Ethernet switching chip (local area network (LAN) switch (LSW)) in the interface board. FIG. 4 is a schematic diagram of a hardware structure of a main control board, and FIG. 5 is a schematic diagram of a hardware structure of an interface board.

As shown in FIG. 4, the main control board may include a processor 1, an Ethernet interface (used for a management network port), a physical layer Ethernet interface 1, an Ethernet interface connected to an interface board processor, a volatile memory 1 (such as a random-access (RAM)), and a non-volatile memory 1 (such as a flash memory (flash)). The processor 1 is connected to the volatile memory 1, the non-volatile memory 1, the Ethernet interface (used for the management network port), and the Ethernet interface connected to the interface board processor 1. The Ethernet interface (used for the management network port) is connected to the physical layer Ethernet interface 1, and the Ethernet interface connected to the interface board processor 2 is connected to a physical layer Ethernet interface 2.

Figure 5:
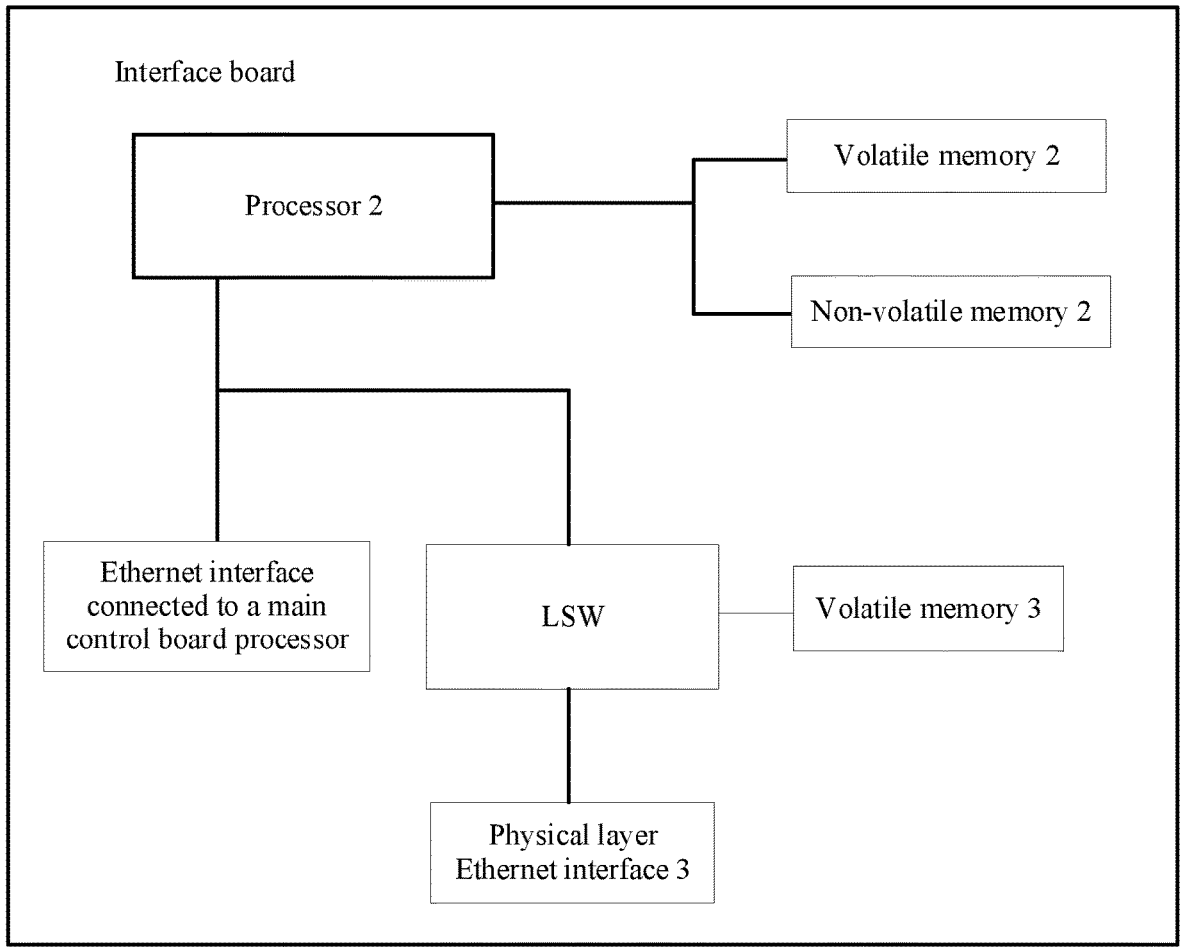
FIG. 5 is a schematic diagram of a hardware structure of an interface board of a device according to an embodiment of this disclosure.

As shown in FIG. 5, the interface board may include a processor 2, an Ethernet interface connected to a main control board processor 1, an LSW, a physical layer Ethernet interface 3, a volatile memory 2, and a non-volatile memory 2. The processor 2 is connected to the volatile memory 2, the non-volatile memory 2, the LSW, and the Ethernet interface connected to the main control board processor 1. A volatile memory 3 is connected to the LSW.

The processor 1 and the processor 2 may respectively be a control unit of the main control board and a control unit of the interface board. A program run by each of the processor 1 and the processor 2 and a static configuration parameter of each of the processor 1 and the processor 2 may be stored in a corresponding non-volatile memory, and code executed during program running and related data may be stored in a corresponding volatile memory. The processor 1 and the processor 2 may cooperate to complete related operations of the first device or the second device in the foregoing method embodiments, and effectively control the forwarding behavior of the LSW. In addition, the processor 1 and the processor 2 may further control the LSW to perform initialization, service entry delivery, protocol packet receiving and sending, various interruptions (including port online/offline state processing), and the like. In addition, the LSW may optionally have the external volatile memory 3, and the volatile memory 3 may be configured to store a packet that needs to be sent by the first device or the second device. In some application scenarios, the volatile memory 3 may further alleviate insufficiency of an internal buffer of the LSW chip. The physical layer Ethernet interface 3 connected to the LSW and the physical layer Ethernet interface 2 on the main control board may implement Ethernet interface interconnection of an optical port or an electrical port.

Figure 6:
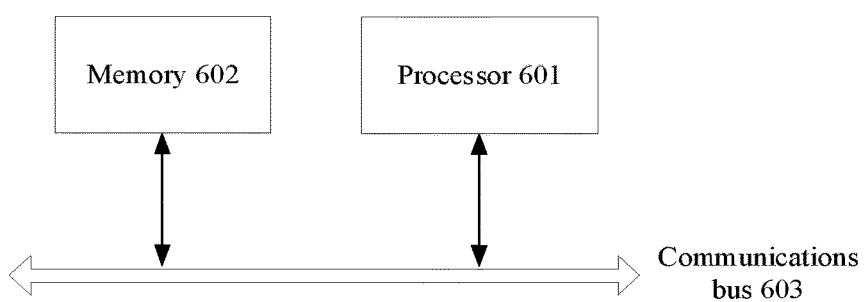
FIG. 6 is a schematic diagram of a hardware structure of a device according to an embodiment of this disclosure.
Figure 7:
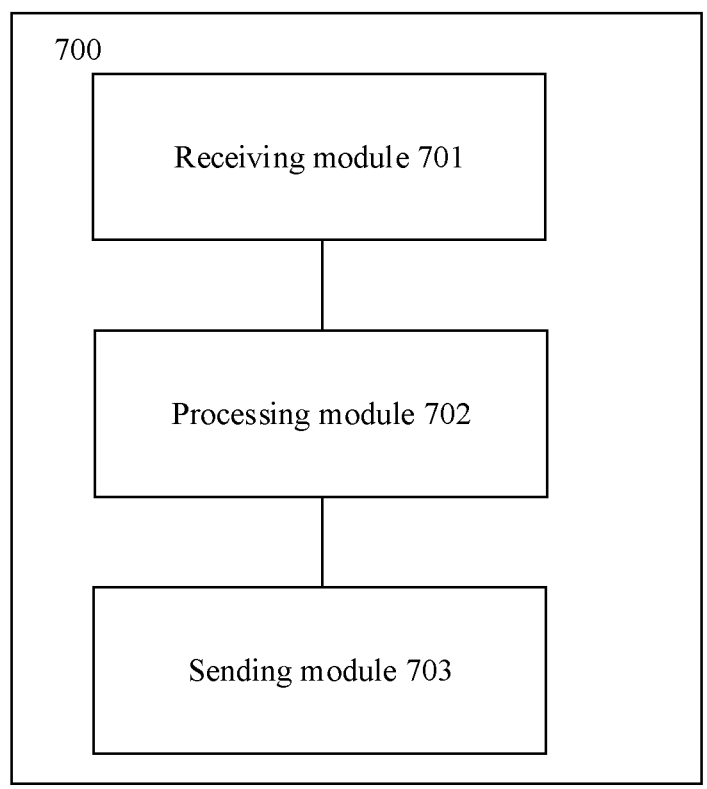
FIG. 7 is a schematic diagram of a structure of a packet transmission apparatus according to an embodiment of this disclosure.

In addition, an embodiment of this application further provides a schematic diagram of another hardware structure of the first VTEP and/or the second VTEP (or a leaf device on which the first VTEP and/or the second VTEP are/is located). FIG. 6 is a schematic diagram of a hardware structure of another device according to an embodiment of this application.

The device may include at least one processor 601 and at least one memory 602. The processor 601 may be connected to the memory 602. For example, the processor 601 and the memory 602 may be connected through a bus 603 shown in FIG. 6. Certainly, in actual application, the processor 601 and the memory 602 may be connected through various interfaces, transmission lines, buses, or the like. This is not limited in this embodiment.

The memory 602 may be configured to store computer programs or instructions.

The processor 601 may be configured to execute the computer programs or instructions, and perform the following steps according to the computer programs or instructions: receiving a first packet from a first host; and sending a second packet to a third VTEP based on a first IP address corresponding to the first host, where the second packet is obtained by the first VTEP by encapsulating the first packet, the first host is multi-homed to a second VTEP and the first VTEP, the second VTEP is configured to send a packet from the first host to the third VTEP based on a second IP address corresponding to the first host, and the first IP address is the same as the second IP address.

In some possible implementations, the processor 601 may further perform the following step according to the computer programs or instructions: when the first VTEP receives an ARP request from the first host through a preset access port, the first VTEP sends a first advertisement packet for the first host to the second VTEP and/or the third VTEP based on the first IP address, where the first advertisement packet includes a MAC address of the first host and the first IP address.

In some possible implementations, the processor 601 may further perform the following step according to the computer programs or instructions: when the first VTEP receives a second advertisement packet for the first host from the second VTEP, the first VTEP sends a first advertisement packet for the first host to the second VTEP and/or the third VTEP based on the first IP address, where the first advertisement packet and the second advertisement packet include a MAC address of the first host, the second advertisement packet does not include the first IP address, and the first advertisement packet includes the first IP address.

In some possible implementations, the processor 601 may further perform the following step according to the computer programs or instructions: before the first VTEP does not receive the second advertisement packet sent by the second VTEP based on the second IP address, the first VTEP sends the first third advertisement packet to the second VTEP and/or the third VTEP based on an initial IP address, where the initial IP address is different from the first IP address.

In some possible implementations, the processor 601 may further perform the following step according to the computer programs or instructions: when the first VTEP fails to send the second packet to the third VTEP, the first VTEP sends a third packet to the second VTEP based on the first IP address, where the third packet is obtained by the first VTEP by encapsulating the first packet, and a destination IP address included in the third packet is different from a destination IP address included in the second packet.

In some possible implementations, a quantity of devices to which the first host is multi-homed is a first quantity, and the processor 601 may further perform the following step according to the computer programs or instructions: when the quantity of VTEPs to which the first host is multi-homed changes from the first quantity to a second quantity, the first VTEP configures a third IP address corresponding to the second quantity for the first host, where the third IP address is different from the first IP address.

In some possible implementations, a quantity of VTEPs to which the first host is multi-homed is a first quantity, the first VTEP sends the second packet to the third VTEP based on the first IP address corresponding to the first host, and the processor 601 may further perform the following step according to the computer programs or instructions: when the quantity of VTEPs to which the first host is multi-homed changes from the first quantity to a second quantity, the first VTEP sends the second packet to the third VTEP based on the first IP address.

In some possible implementations, the first VTEP is further connected to a second host, and the processor 601 may further perform the following step according to the computer programs or instructions: the first VTEP sends a fourth packet to the third VTEP based on a fourth IP address corresponding to the second host, where the fourth IP address is different from the first IP address.

It should be noted that the processor in this application may include but is not limited to at least one of the following various computing devices that run software: a central processing unit (CPU), a microprocessor, a digital signal processor (DSP), a microcontroller unit (MCU), an artificial intelligence processor, and the like. Each computing device may include one or more cores configured to execute software instructions to perform operation or processing. The processor may be a separate semiconductor chip; or may be integrated with another circuit into a semiconductor chip, for example, may form a system-on-a-chip with another circuit (for example, a codec circuit, a hardware acceleration circuit, or various bus and interface circuits); or may be integrated into an application-specific integrated circuit (ASIC) as a built-in processor of the ASIC. The ASIC integrated with the processor may be packaged separately or may be packaged together with another circuit. The processor includes a core for executing software instructions to perform operation or processing, and may further include a necessary hardware accelerator, for example, a field-programmable gate array (FPGA), a programmable logic device (PLD), or a logic circuit that implements a special-purpose logic operation.

The memory in embodiments of this application may include at least one of the following types: a read-only memory (ROM) or another type of static storage device that can store static information and instructions, or a random-access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage, a disc storage medium, a magnetic disk storage medium or another magnetic storage device, or any other medium that can be used to carry or store expected program code in a form of instructions or a data structure and can be accessed by a computer, but is not limited thereto.

The memory may exist independently and be connected to the processor. The memory can store program code for executing the technical solutions in embodiments of this application, and the processor controls the execution. Various types of executed computer program code may also be considered as drivers for the processor. For example, the processor is configured to execute the computer program code stored in the memory, to implement the technical solutions in embodiments of this application.

In addition, an embodiment of this application further provides a packet transmission apparatus. The apparatus 700 may be used in the first VTEP or a device in which the first VTEP is located in the foregoing method embodiments. The apparatus 700 may include a receiving module 701, a processing module 702, and a sending module 703.

The receiving module 701 is configured to receive a first packet from a first host.

The sending module 703 is configured to send a second packet to a third VTEP based on a first IP address corresponding to the first host, where the second packet is obtained by the processing module 702 by encapsulating the first packet, the first host is multi-homed to a second VTEP and the first VTEP, the second VTEP is configured to send a packet from the first host to the third VTEP based on a second IP address corresponding to the first host, and the first IP address is the same as the second IP address.

In some possible implementations, the sending module 703 is further configured to: when the receiving module 701 receives an ARP request from the first host through a preset access port, send a first advertisement packet for the first host to the second VTEP and/or the third VTEP based on the first IP address, where the first advertisement packet includes a MAC address of the first host.

In some possible implementations, the sending module 703 is further configured to: when the receiving module 701 receives a second advertisement packet for the first host from the second VTEP, send a first advertisement packet for the first host to the second VTEP and/or the third VTEP based on the first IP address, where the first advertisement packet includes a MAC address of the first host and the first IP address.

In some possible implementations, the sending module 703 is further configured to: before the receiving module 701 receives the second advertisement packet sent by the second VTEP based on the second IP address, send a third advertisement packet to the second VTEP and/or the third VTEP based on an initial IP address, where the initial IP address is different from the first IP address, the second advertisement packet does not include the first IP address, and the first advertisement packet includes the first IP address.

In some possible implementations, the sending module 703 is further configured to: when the first VTEP fails to send the second packet to the third VTEP, send a third packet to the second VTEP based on the first IP address, where the third packet is obtained by the processing module 702 by encapsulating the first packet, and a destination IP address included in the third packet is different from a destination IP address included in the second packet.

In some possible implementations, a quantity of devices to which the first host is multi-homed is a first quantity, and the processing module 702 is further configured to: when the quantity of VTEPs to which the first host is multi-homed changes from the first quantity to a second quantity, configure a third IP address corresponding to the second quantity for the first host, where the third IP address is different from the first IP address.

In some possible implementations, a quantity of devices to which the first host is multi-homed is a first quantity, and the sending module 702 is configured to: when the quantity of VTEPs to which the first host is multi-homed changes from the first quantity to a second quantity, send the second packet to the third VTEP based on the first IP address.

In some possible implementations, the first VTEP is further connected to a second host, and the sending module 703 is further configured to send a fourth packet to the third VTEP based on a fourth IP address corresponding to the second host, where the fourth IP address is different from the first IP address.

It should be noted that, content such as information exchange and an execution process between the modules of the foregoing apparatus is based on a same concept as the method embodiment in embodiments of this application, and brings a technical effect the same as that of the method embodiment in embodiments of this application. For specific content, refer to the description in the method embodiment shown above in embodiments of this application, and details are not described herein again.

It may be clearly understood by a person skilled in the art that, for the purpose of convenient and brief description, for a detailed working process of the foregoing apparatus, module, and unit, refer to a corresponding process in the foregoing method embodiments, and details are not described herein again.

In this application, "of", "corresponding or relevant", and "corresponding" may be used interchangeably in some cases. It should be noted that these terms express consistent meanings when differences between these terms are not emphasized.

It should be noted that, in embodiments of this application, the word "example" or "for example" is used to represent giving an example, an illustration, or a description. Any embodiment or design scheme described as "example" or "for example" in embodiments of this application should not be explained as being more preferred or having more advantages than another embodiment or design scheme. Exactly, use of the word "example" or "for example" or the like is intended to present a related concept in a specific manner.

In this application, "at least one" refers to one or more. "A plurality of" means two or more than two. "And/or" describes an association relationship between associated objects, and indicates that three relationships may exist. For example, A and/or B may indicate the following three cases: A exists alone, both A and B exist, and B exists alone, where A and B may be singular or plural. The character "/" generally indicates an "or" relationship between the associated objects. "At least one of the following items (pieces)" or a similar expression thereof refers to any combination of these items, including a single item (piece) or any combination of a plurality of items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the words such as "first" and "second" limit neither of a quantity and an execution sequence, and the words such as "first" and "second" do not indicate a definite difference either.

A system architecture and a service scenario that are described in embodiments of this application are intended to describe the technical solutions in embodiments of this application more clearly, but constitute no limitation on the technical solutions provided in embodiments of this application. A person of ordinary skill in the art may know that, with evolution of the network architecture and emergence of new service scenarios, the technical solutions provided in embodiments of this application are also applicable to similar technical problems.

In the several embodiments provided in this application, it should be understood that the disclosed apparatus, device, and method may be implemented in other manners. For example, the described apparatus embodiment is merely illustrative. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the technology, or all or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a Universal Serial Bus (USB) flash drive, a removable hard disk, a ROM, a RAM, a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A packet transmission method implemented by a first virtual extensible local area network tunnel endpoint (VTEP), wherein the method comprises:
   receiving a first packet from a first host, wherein the first host is multi-homed to the first VTEP and a second VTEP;
   encapsulating a header into the first packet to obtain a second packet;
   sending, based on a first Internet Protocol (IP) address corresponding to the first host, the second packet to a third VTEP; and
   continuing, when a quantity of VTEPs to which the first host is multi-homed changes from a first quantity to a second quantity, sending packets for the first host using the first IP address.

2. The method of claim 1, further comprising:
   receiving an Address Resolution Protocol (ARP) request from the first host through a preset access port; and
   sending, based on the first IP address and in response to the ARP request, a first advertisement packet for the first host to the second VTEP or the third VTEP,
   wherein the first advertisement packet comprises a first media access control (MAC) address of the first host and a second MAC address of the first IP address.

3. The method of claim 1, further comprising:
   receiving a first advertisement packet for the first host from the second VTEP; and
   sending, based on the first IP address and in response to the first advertisement packet, a second advertisement packet for the first host to the second VTEP or the third VTEP,
   wherein the first advertisement packet and the second advertisement packet comprise a media access control (MAC) address of the first host,
   wherein the first advertisement packet does not comprise the first IP address, and
   wherein the second advertisement packet comprises the first IP address.

4. The method of claim 3, wherein before receiving the first advertisement packet, the method further comprises sending, based on an initial IP address, a third advertisement packet to the second VTEP or the third VTEP, and wherein the initial IP address is different from the first IP address.

5. The method of claim 1, wherein the header comprises a virtual extensible local area network (VXLAN) header, and wherein encapsulating the header into the first packet to obtain the second packet comprises encapsulating the VXLAN header into the first packet to obtain a VXLAN packet.

6. The method of claim 1, further comprising:
   connecting to a second host; and
   sending, based on a second IP address corresponding to the second host, a third packet to the third VTEP,
   wherein the second IP address is different from the first IP address.

7. An apparatus in a first virtual extensible local area network tunnel endpoint (VTEP), wherein the apparatus comprises:
   a memory configured to store instructions; and
   at least one processor coupled to the memory and configured to execute the instructions to cause the apparatus to:
   receive a first packet from a first host, wherein the first host is multi-homed to the first VTEP and a second VTEP;
   encapsulate a header into the first packet to obtain a second packet;
   send, based on a first Internet Protocol (IP) address corresponding to the first host, the second packet to a third VTEP; and
   continue, when a quantity of VTEPs to which the first host is multi-homed changes from a first quantity to a second quantity, to send packets for the first host using the first IP address.

8. The apparatus of claim 7, wherein the at least one processor is further configured to execute the instructions to cause the apparatus to:
   receive an Address Resolution Protocol (ARP) request from the first host through a preset access port; and
   send, based on the first IP address and in response to the ARP request, a first advertisement packet for the first host to the second VTEP or the third VTEP,
   wherein the first advertisement packet comprises a first media access control (MAC) address of the first host and a second MAC address of the first IP address.

9. The apparatus of claim 7, wherein the at least one processor is further configured to execute the instructions to cause the apparatus to:

receive a first advertisement packet for the first host from the second VTEP; and send, based on the first IP address and in response to the first advertisement packet, a second advertisement packet for the first host to the second VTEP or the third VTEP, wherein the first advertisement packet comprises a media access control (MAC) address of the first host, wherein the first advertisement packet does not comprise the first IP address, and wherein the second advertisement packet comprises the first IP address.

10. The apparatus of claim 9, wherein before receiving the first advertisement packet, the at least one processor is further configured to execute the instructions to cause the apparatus to send, based on an initial IP address, a third advertisement packet to the second VTEP or the third VTEP, and wherein the initial IP address is different from the first IP address.

11. The apparatus of claim 7, wherein the header comprises a virtual extensible local area network (VXLAN) header, and wherein the at least one processor is configured to execute the instructions to cause the apparatus to encapsulate the header into the first packet to obtain the second packet by encapsulating the VXLAN header into the first packet to obtain a VXLAN packet.

12. The apparatus of claim 7, wherein the at least one processor is configured to execute the instructions to cause the apparatus to:

connect to a second host; and send, based on a second IP address corresponding to the second host, a third packet to the third VTEP, wherein the second IP address is different from the first IP address.

13. A computer program product comprising instructions stored on a non-transitory computer-readable storage medium that, when executed by at least one processor, cause a first virtual extensible local area network tunnel endpoint (VTEP) to:

receive a first packet from a first host, wherein the first host is multi-homed to the first VTEP and a second VTEP;

encapsulate a header into the first packet to obtain a second packet;

send, based on a first Internet Protocol (IP) address corresponding to the first host, the second packet to a third VTEP; and continue, when a quantity of VTEPs to which the first host is multi-homed changes from a first quantity to a second quantity, to send packets for the first host using the first IP address.

14. The computer program product of claim 13, wherein the instructions further cause the first VTEP to:

receive an Address Resolution Protocol (ARP) request from the first host through a preset access port; and send, based on the first IP address and in response to the ARP request, a first advertisement packet for the first host to the second VTEP or the third VTEP, wherein the first advertisement packet comprises a first media access control (MAC) address of the first host and a second MAC address of the first IP address.

15. The computer program product of claim 13, wherein the instructions further cause the first VTEP to:

receive a first advertisement packet for the first host from the second VTEP; and send, based on the first IP address and in response to the first advertisement packet, a second advertisement packet for the first host to the second VTEP or the third VTEP, wherein the first advertisement packet and the second advertisement packet comprise a media access control (MAC) address of the first host, wherein the first advertisement packet does not comprise the first IP address, and wherein the second advertisement packet comprises the first IP address.

16. The computer program product of claim 15, wherein before receiving the first advertisement packet, the instructions further cause the first VTEP to send, based on an initial IP address, a third advertisement packet to the second VTEP or the third VTEP, and wherein the initial IP address is different from the first IP address.

17. The computer program product of claim 13, wherein the header comprises a virtual extensible local area network (VXLAN) header, and wherein the instructions further cause the first VTEP to encapsulate the header into the first packet to obtain the second packet by encapsulating the VXLAN header into the first packet to obtain a VXLAN packet.

18. The computer program product of claim 13, wherein the instructions further cause the first VTEP to:

connect to a second host; and send, based on a second IP address corresponding to the second host, a third packet to the third VTEP, and wherein the second IP address is different from the first IP address.

19. The computer program product of claim 13, wherein the first quantity is greater than the second quantity.

20. The computer program product of claim 13, wherein the first quantity is less than the second quantity.

* * * * *